United States Patent [19]

Kumar et al.

[11] Patent Number: 5,561,769

[45] Date of Patent: Oct. 1, 1996

[54] METHOD AND APPARATUS FOR EXECUTING A DISTRIBUTED ALGORITHM OR SERVICE ON A SIMPLE NETWORK MANAGEMENT PROTOCOL BASED COMPUTER NETWORK

[75] Inventors: Vijay P. Kumar, Freehold, N.J.; Mark E. Stahl, Pittsburgh, Pa.

[73] Assignee: Lucent Technologies Inc., Murray Hill, N.J.

[21] Appl. No.: 523,564

[22] Filed: Sep. 5, 1995

Related U.S. Application Data

[63] Continuation of Ser. No. 241,302, May 10, 1994, abandoned.

[51] Int. Cl.$^6$ ................................................. G06F 15/173
[52] U.S. Cl. ............... 395/200.05; 395/375; 395/200.01; 364/DIG. 1; 364/DIG. 2; 370/58.3; 370/60.1
[58] Field of Search ...................... 395/200.05, 200.01, 395/375; 370/58.3, 60.1

[56] References Cited

U.S. PATENT DOCUMENTS

| | | | |
|---|---|---|---|
| 5,131,016 | 7/1992 | Broughton et al. | 375/122 |
| 5,185,860 | 2/1993 | Wu | 955/200 |
| 5,276,871 | 1/1994 | Howarth | 395/600 |
| 5,289,468 | 2/1994 | Yoshida | 370/85.13 |
| 5,329,619 | 7/1994 | Page et al. | 395/200 |
| 5,367,635 | 11/1994 | Bauer et al. | 395/200 |

OTHER PUBLICATIONS

Using SNMP to Manage Networks by Drake, IEEE pp. 211–214.
Pratical Application and Implementation of Distributed System– Level diagnosis Theory by Bianchini et al, 1990 IEE Publication, pp. 332–339.
Towards a Framework for High–Speed Communication in a Heterogeneous Networking Environment by Parulkar et al, 1990 IEEE, pp.
An Introduction to Network Architectures and Protocols by Green, IBM Syst. J. vol. 18, No. 2, 1979, pp. 202–222.
"Implementation of On–Line Distribued System–Level Diagnosis Theory", Bianchini, Jr., Ronald P., Buskens, Richard W., IEEE Transactions on Computers, vol. 41, No. 5, May 1992, pp. 616–626.

*Primary Examiner*—Krisna Lim
*Assistant Examiner*—Zarni Maling

[57] ABSTRACT

The present invention is directed at both a method and an apparatus for executing a distributed algorithm or server in a Simple Network Management Protocol Version 1 (SNMPv1) based computer network. The invention involves configuring a peer arrangement of agent/manager nodes and encapsulating the algorithm or server into SNMPv1. In a peer configuration, each node acts as a manager node, the manager node sends a Get message to an agent node to read a certain location in an agent node's managed information base (MIB) and sends a Set message to an agent node to write to a certain location in an agent node's MIB. This peer configuration also provides that each node act as an agent node, the agent node sends a GetResponse message to a manager node in response to a Get message and sends a Trap message to a manager node in response to an event. Encapsulating of the algorithm or server within SNMPv1 involves mapping the proprietary protocol to the SNMPv1 messages and mapping the algorithm or server variables to certain locations in the MIB. When mapping the algorithm or server, algorithm command variables, placeholder variables, and data variables are assigned to certain locations within the MIB.

15 Claims, 4 Drawing Sheets

METHOD AND APPARATUS FOR EXECUTING A DISTRIBUTED ALGORITHM OR SERVICE ON A SIMPLE NETWORK MANAGEMENT PROTOCOL BASED COMPUTER NETWORK

This application is a continuation of U.S. patent application Ser. No. 08/241,302, filed on May 10, 1994, now abandoned.

BACKGROUND OF THE INVENTION

The present invention relates to both a method and an apparatus for executing a distributed algorithm or service on a Simple Network Management Protocol version 1 (SNMPv1) based computer network. In the Local Area Network (LAN) environment, particularly those networks based on Transmission Controlled Protocol (TCP) and Internet Protocol (IP), Simple Network Management Protocol Version 1 (SNMPv1) has emerged as a standard tool for managing network devices. SNMPv1 normally operates by having one or more central manager node(s) oversee multiple agent nodes as shown in FIG. 1. As depicted, each agent node 2 supports a local, tree-structured database, called a Managed Information Base 3 (MIB) and software that allows a valid manager node 1 to access information in MIB 3. Agent node 2 responds to command messages sent by manager node 1. Messages that can be sent by manager node 1 to agent node 2 include: "Get" which is sent to read certain locations in MIB 3; "GetNext" which is similar to Get; and "Set" which is sent to write information to a location in MIB 3. Messages that may be sent by agent node 2 to manager node 1 include: "GetResponse" which is sent in response to a Get, GetNext, or Set command, and returns information to manager 1; and "Trap" which is sent asynchronously or, in other words, upon the occurrence of a predetermined event. Certain traps are predefined by SNMPv1. Other Traps are "enterprise specific" which means they can be defined to carry information specific to a particular algorithm or service.

Although commonly used, a centralized manager configuration has several shortcomings. For example, it creates communication overhead in the vicinity of the management station. Centralized management also constitutes a single point of failure in a system. That is, if the manager goes down, the entire system goes with it. The problems facing diagnostic algorithms exemplify other limitations of a traditional SNMPv1 based network. Fault detection in SNMPv1 is limited to two methods: polling and trap-notification. Managers poll agents to detect failed nodes. In a large network, however, the polling interval can become excessive, leading to large diagnostic latencies. Alternatively, the agents can inform the central observer of any failure. This, however, requires the device to remain partially operational under failure which tends to be unreliable in SNMPv1. Additionally, centralized management systems have "multi-hop communication" which may cause intermediate failures to mask the fault state of the monitored node. These problems are solved through distributed diagnosis.

There has been a large body of theoretical results in the area of system-level diagnosability and distributed diagnosis. Recently, these studies have been applied in real systems. One of the most advanced applications to date was achieved by Ronald P. Bianchini, Jr. and Richard W. Buskens as described in *Implementation of On-Line Distributed System-Level Diagnosis Theory*, IEEE Transactions on Computers, Vol. 41, No. 5, p. 616 (May 1992). This paper documents an early application of on-line distributed system-level diagnosis theory using Adaptive-Distributed System Diagnostics (ADSD). Key results of this paper include: an overview of earlier distributed system-level diagnosis algorithms, the specification of a new adaptive distributed system-level diagnosis algorithm, its comparison to previous centralized adaptive and distributed non-adaptive schemes, its application to an actual distributed network environment, and the experimentation within that environment.

The system described in Bianchini et al. uses a Berkeley socket interface and Ethernet IP/UDP protocols to facilitate ADSD. These protocols, however, may be impractical in the long run. In the LAN environment, SNMPv1 is the standard protocol for managing network devices. Yet, to date, SNMPv1 is not fully distributed. SNMPv1 only performs fault diagnosis via a centralized manager. Furthermore, SNMP version 2 offers greater distributed control but still maintains a hierarchial arrangement as shown in FIG. 2. One top manager 21 manages several secondary agent/managers 22, one of which, in turn, manages a third-level agent/managers 23, and so on until nodes are reached which act as dedicated agents 24. Therefore, a need arises for a SNMPv1 to run fully distributed algorithms and services. The present invention fulfills this need.

SUMMARY OF THE INVENTION

The present invention is directed at providing both a method and an apparatus for executing a distributed algorithm or service on a Simple Network Management Protocol version 1 (SNMPv1) based computer network. The invention accomplishes this by implementing two major concepts: the agent/manager concept, and the encapsulation concept. The agent/manager concept involves forming a "peer" relationship between the nodes in which each node acts as both a manager and an agent. The encapsulation concept involves mapping the proprietary protocol and variables of an algorithm or service into SNMPv1. In essence, encapsulation serves to translate a distributed algorithm or service into terms of SNMPv1.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE INVENTION

Simple Network Management Protocol version 1 (SNMPv1) is a well accepted standard for LAN management. As SNMPv1 based LANs grow in size and complexity, the complexity of managing such systems increases in kind. The need for quick response times gives rise to distributed system algorithms and services. The present invention provides for a method and an apparatus for executing a distributed algorithm or service on a SNMPv1 based computer network. The following description discusses the present invention in terms of (A) the execution of algorithms, (B) the execution of servers, and (C) the interface with Asynchronous Transfer Mode (ATM) networks.

A

The present invention facilitates the execution of distributed algorithms on SNMPv1 based computer networks. In one preferred embodiment, a diagnostic algorithm called Adaptive-DSD (ADSD) is used. This algorithm is discussed in *Implementation of On-Line Distributed System-Level Diagnosis Theory*, which is mentioned above and incorporated as a reference herein. For purposes of discussion, the present invention will be described in terms of ADSD as applied to SNMPv1. It should be understood, however, that the present invention is not restricted to ADSD and that other distributed algorithms and services will work as well. In fact, it is expected that the present invention will facilitate the development of distributed algorithms and services not yet available or contemplated.

The present invention facilitates execution of distributed algorithms by realizing two major concepts: (1) the Agent/Manager Concept, and (2) the Encapsulation Concept.

1. Agent/manager Concept

Figure 3:
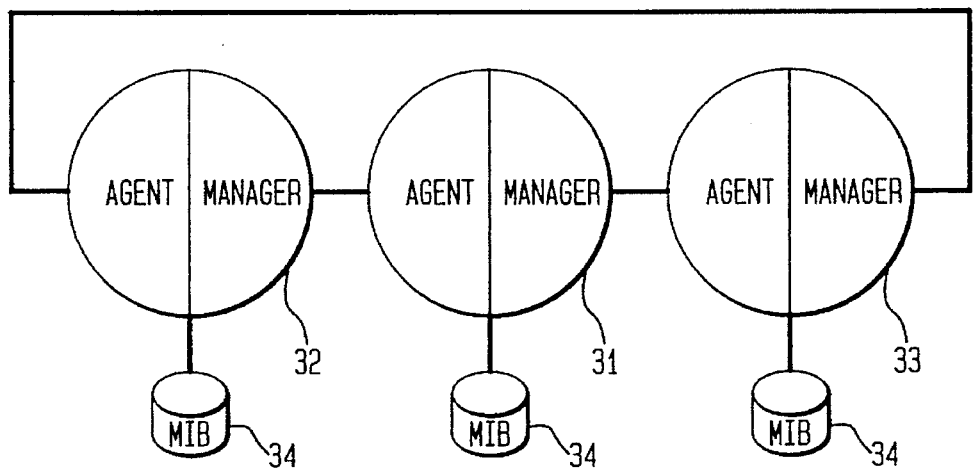
FIG. 3 shows the agent/manager node configuration in a distributed system.
Figure 4:
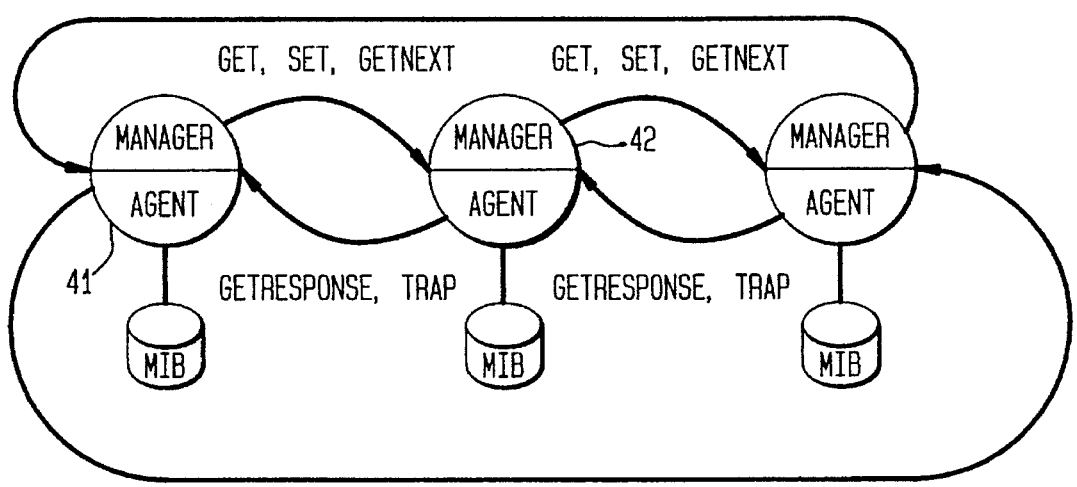
FIG. 4 shows the peer management configuration of the present invention.

The present invention introduces the idea of a "peer" arrangement of "agent/manager" nodes for SNMPv1. This configuration eliminates the "hierarchy" between the nodes; all agent/manager nodes are of equivalent importance. In the ADSD algorithm, nodes are organized in a logical ring thereby defining a particular sequence of nodes. As shown in FIG. 3, in SNMP-ADSD, each node appears as a manager node to the next sequential node in the ring. For example, if the sequence progresses from left to right, node 31 is a manager node for node 33 and an agent node for node 32. This sequence is important in certain applications such as ADSD wherein a manager node tests nodes in the particular sequence of the ring until a fault free node is found. A node acting as an agent supports a local MIB 34 for the preceding (manager) node. FIG. 4 depicts the interaction between peer agent/manager nodes. A node 41 (acting as a manager) sends commands (i.e., Get, GetNext and Set) to a node 42 (acting as an agent) and processes commands (i.e., GetResponse and Trap) from node 42. Node 42 processes manager commands received from the preceding node and returns commands. Hence, each node is both a manager and an agent.

Figure 1:
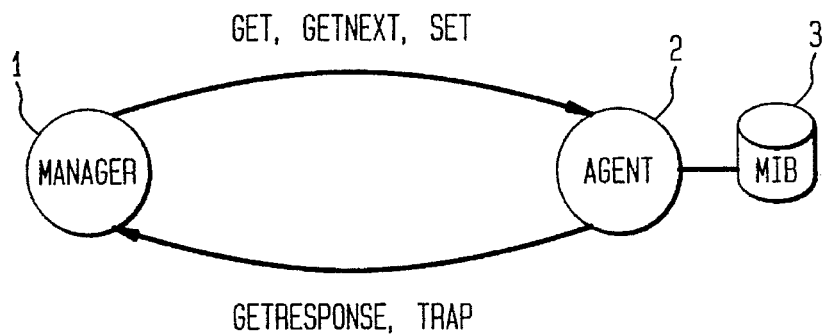
FIG. 1 depicts the traditional centralized manager configuration in SNMPv1.
Figure 2:
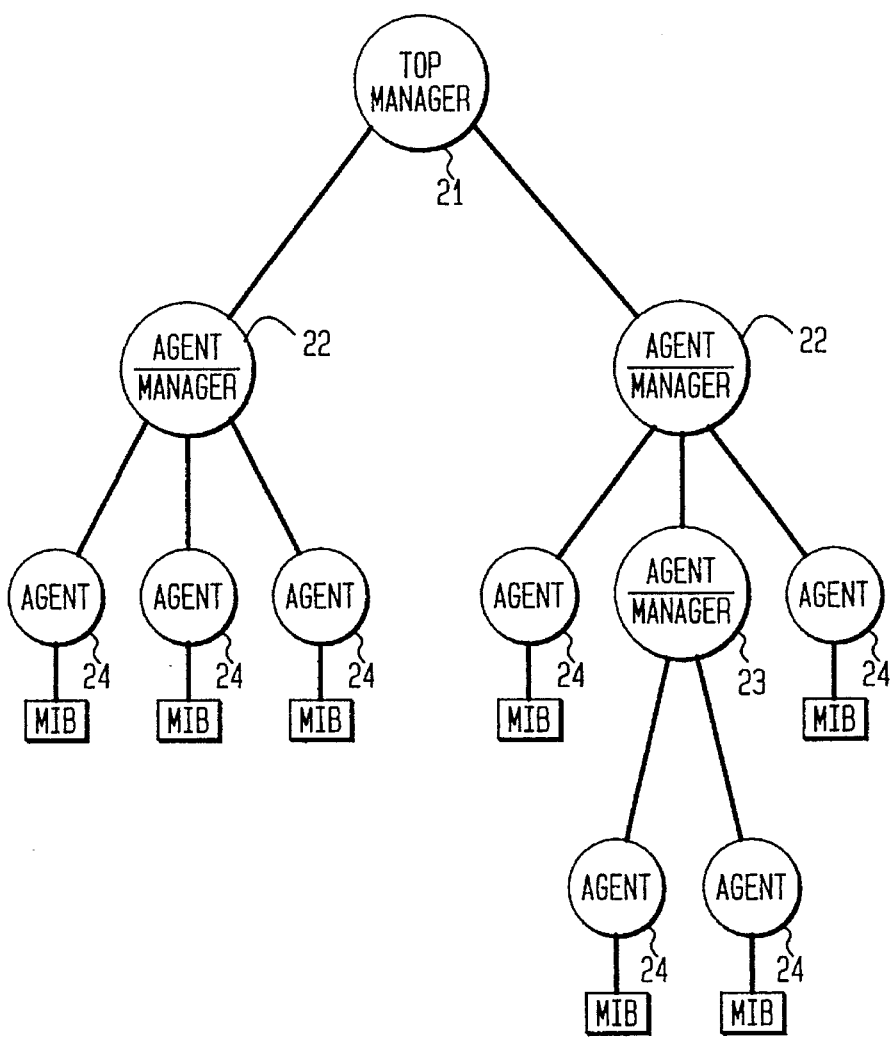
FIG. 2 depicts a traditional hierarchial management configuration.

The "peer" configuration between agents and managers distinguishes SNMP-ADSD agent/manager nodes from other schemes that have been proposed. For example, SNMP version 2 (see FIG. 2) uses a top manager and dedicated agents. Since SNMP-ADSD agent-managers are arranged as peers, no Top manager exists. Thus, operating a distributed network diagnosis algorithm via peer-to-peer agent/managers nodes (as opposed to a centralized manager or hierarchical management) is a novel way to achieve system-level diagnosis and network management.

2. Encapsulation Concept

In addition to re-configuring the nodes of a SNMPv1 based network to act as agent/managers, apparatus and method according to the present invention "encapsulates" or incorporates an algorithm or service within SNMPv1 using an encapsulation map. SNMP-ADSD provides a particular example of encapsulation wherein a distributed algorithm (in this case ADSD) is mapped to operate wholly within an SNMPv1 framework.

When implementing any distributed algorithm or service, a proprietary protocol is usually defined to carry out the commands required of the distributed algorithm or service. In ADSD, messages normally sent between nodes include "request a node to forward all information in its tested-up array," "send diagnostic information to another node," and "acknowledge that a message was received". There are also services that an agent node provides to the client node, such as "tell me the current diagnosis."

When encapsulating, all the services and protocols are replaced by SNMPv1 commands and MIB variables. The encapsulation map translates the proprietary commands of the algorithm into SNMPv1 messages having equivalent functionality. There are essentially two steps to encapsulating an algorithm: a) Protocol Message Mapping, and b) MIB Variable Mapping. The components of encapsulation are interrelated, and each step is described below using SNMP-ADSD as an example.

a. Protocol Message Mapping

The messages that normally make up the proprietary protocol of an algorithm are mapped to SNMPv1 messages which act as functional equivalents. Mapping between SNMPv1 messages and a particular algorithm is controlled by certain considerations. First, the SNMPv1 messages should be "clean" and be free from extraneous fields. Second, the messages generated and the responses they elicit should be consistent with traditional SNMPv1 protocol. This means that Get and Set requests should produce a response of the correct format, and all information passed should correspond to a node writing to or reading from a client's MIB. For this reason, MIB locations are defined for passing data between nodes, and Trap messages are used to convey information which does not easily fit into Get and GetResponse messages of SNMPv1.

Figure 5A:
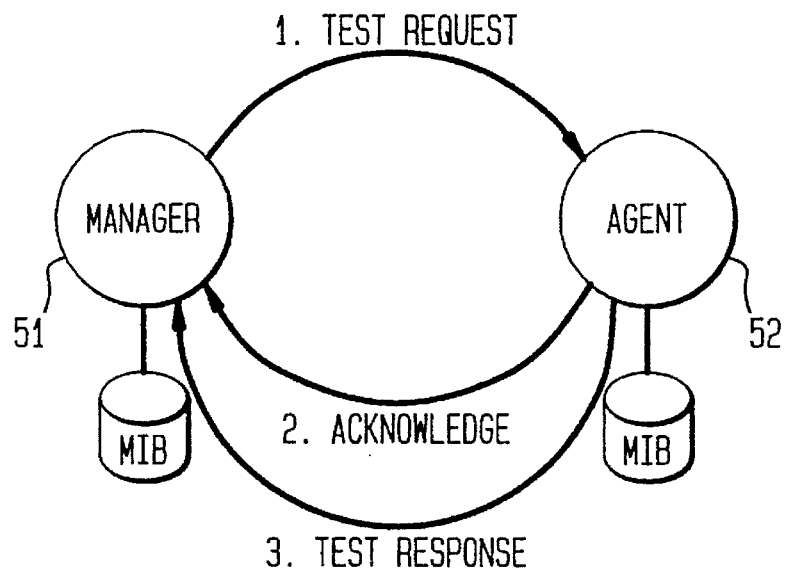
FIGS. 5(a) and 5(b) show the mapping of ADSD protocol to SNMPv1 equivalents.
Figure 5B:
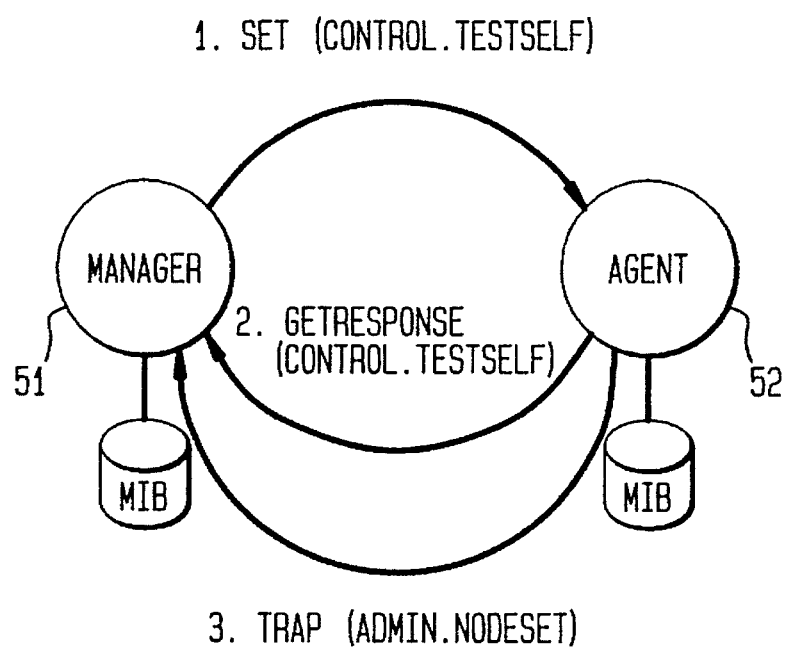

Mapping of ADSD to SNMPv1 is depicted in Table 1. That table shows the translation of ADSD protocol to SNMPv1 protocol. An illustration of the ADSD-SNMPv1 mapping for one sample message exchange is provided in FIGS. 5(a) and 5(b). To request a test, a manager node 51 would normally send a proprietary "test request" message to an agent node 52 which would respond with an "acknowledgement." Subsequently, tested agent node 52 would send a test result message to manager node 51 which would acknowledge it. The translated protocol is shown in FIG. 5b. In the SNMPv1 mapped protocol, a test request is issued by manager node 51 which sends a "Set" command to agent node 52. The request is acknowledged immediately by a "Get Response" message. When the test is complete, agent node 52 sends the test result to manager node 51 via an SNMPv1 Trap message. An enterprise specific (user defined) trap is reserved for this purpose. In this way, all messages normally exchanged by the ADSD protocol are replaced by functionally equivalent messages using the SNMPv1 protocol.

TABLE 1

MAPPING OF ADSD COMMANDS TO SNMPv1 MESSAGES

| ADSD COMMAND | ADAPTED SNMPv1 MESSAGE |
|---|---|
| 1) Test Request | SetPDU |
|    Testing Node |    Proved by Comm Layer |
|    Message ID |    PduHeader:requestID |
|    Request Test |    var.binding (control.requestTest) |
|    Test ID |    var.binding (admin.testId) |
| (opt) Forwarding Flag |    var.binding (control.requestForward) |
| (opt) Update/Dump Flag |    var.binding (control.requestDump) |
| 2) Test Request Ack | ResponsePDU |
|    Acknowledging Node |    Provided by Comm Layer |
|    MessageID |    PduHeader:requestID |
|    Test ID |    var.binding (admin.testId) |
|    TestAck |    var.binding (control.requestTest) |
| (opt) ForwardFlagSet |    var.binding (control.requestForward) |
| (opt) DumpFlagset |    var.binding (control.requestDump) |
| 3) Test Reply | TrapPDU (specific-trap = test reply) |
|    Tested Node |    Provided by CommLayer or PduHeader: agentAddress |
|    Message ID |    var.binding (admin.msgId) |
|    Test ID |    var.binding (admin.testId) |
|    Node State |    var.binding (nodestate) |
| 4) Test Reply Ack | TrapPDU (specific-trap = test reply ack) |
|    Acknowledging Node |    Provided by CommLayer or PduHeader: agentAddress |
|    Message ID |    var.binding (adming.MsgId) |
| 5) Forwarded Message | TrapPDU (specifi-trap = forward) |
|    Sending Node |    Provided by CommLayer or PduHeader: agentAddress |
|    Message ID |    var.binding (admin.MsgId) |
|    TU Entry (list) |    var.bindings (data.TuEntry) |
| 6) Forwarded Message Ack | TrapPDU (specific-trap = forward ack) |
|    Acknowledging Node |    Provided by CommLayer or PduHeader: agentAddress |
|    Message ID |    var.binding (admin.MsgId) | b. MIB Variable Mapping

Encapsulation or incorporation involves not only translating the protocol, but also mapping the algorithm variables or services to the MIB. The encapsulation map assigns different MIB locations to support various algorithm variables. When mapping algorithm variables, three components are typically present: command variables, placeholder variables, and data variables. The mapping of SNMP-ADSD is shown in Table 2, which indicates that the MIB for SNMP-ADSD contains several groups having a multitude of variables. This particular MIB structure is reviewed below for illustration purposes.

TABLE 2

MAPPING ADSD VARIABLES TO MIB GROUPS

Admin Group:

| Message ID | Placeholder for message ID's |
|---|---|

Config Group:

| CodeRevMajor | int |
|---|---|
| CodeRevMinor | int |
| ConfigRevMajor | int |
| ConfigRevMinor | int |
| numNodes; | |
| MyNodeid; | |

(Possible further ADSD config values here, including timeout settings, etc.)

Control Group:

requestTest
requestForwarding
requestDump

TABLE 2-continued

MAPPING ADSD VARIABLES TO MIB GROUPS

Address Group:

Table (indexed on NodeNO) of NodeNo. IpAddress
Table (indexed on IpAddress) of NodeNo, IpAddress
Data Group (data structures of ADSD, encoded as MIB structures):

| Table | (indexed on NodeNo) of NodeNo, DiagnosedState | : Diagnosis array |
|---|---|---|
| Table | (indexed on NodeNo) of NodeNo, TuEntry | : TU Array |
| Table | (indexed on NodeNo) of NodeNo | : Forwarding List |

The MIB in SNMP-ADSD has a control group which is used to issue commands to the agent node. The need for a Control Group arises because a manager node sends instructions to an agent via a Set command; however, the preferred embodiment of a set command is limited to writing data to a MIB and not to issuing arbitrary instructions. Accordingly, in SNMP-ADSD, a manager node issues a set command which writes to a particular location in the MIB. Writing to this MIB location instructs the agent node to perform the requested function. As shown in FIG. 5b, the manager node 51 sends a Set command which writes a "1" to the "Request-Test" location. Agent node 52 interprets this "1" to imply "test myself".

Occasionally, the proprietary protocol needs to pass information in addition to the command itself. For this reason, the MIB contains an Admin Group. This group contains objects that act as placeholders in an SNMPv1 message. In ADSD, for example, each test issued has a unique test identification (used by the tester to match requests and responses). For an SNMPv1 Set command to carry a piece of data such as a test identification, however, a memory location in the MIB must exist to write the test identification. This occurs at the same time as a "1" is written to the "test"0 location. In SNMP-ADSD, the Admin group provides the "placeholder" data locations, allowing SNMP-ADSD messages to convey additional information by writing to these locations.

Figure 6:
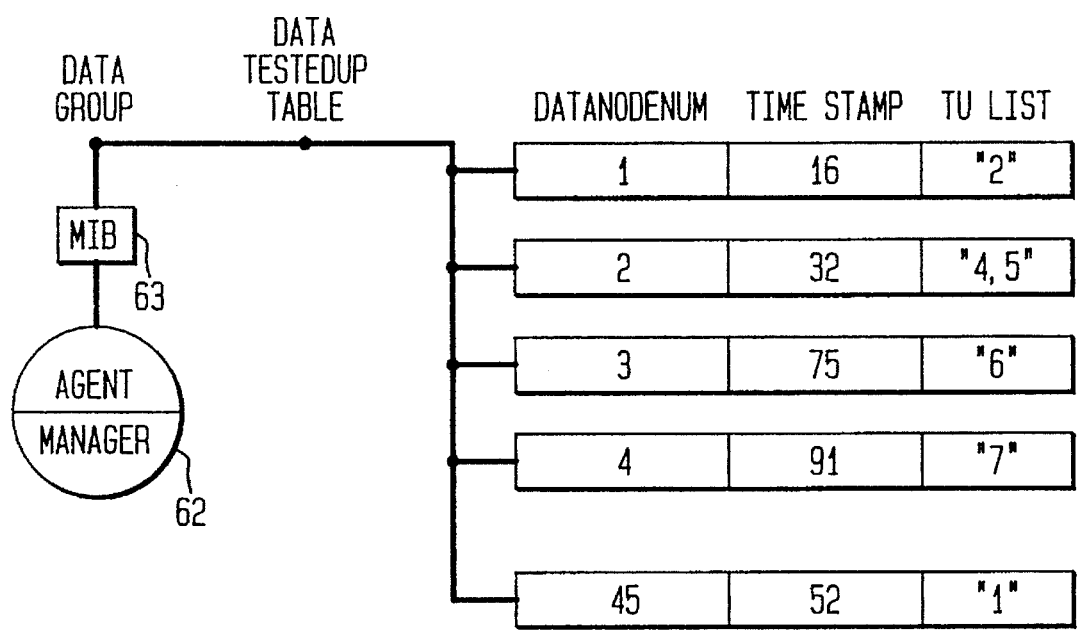
FIG. 6 shows an example MIB structure containing a data array used by the on-line distributed system-level diagnosis algorithm.

All the data contained in the ADSD algorithm is mapped in a Data Group with the MIB. The Data Group is a read-only group that makes transparent to the manager all the internal data structures used by the event-driven, or asynchronous, form of ADSD. This allows outside nodes to query the state of the ADSD algorithm. As schematically shown in FIG. 6, a Tested-Up array 61 is maintained in a MIB 63 of node 62. Other nodes acting as managers can access and retrieve the array via Get and GetNext commands. An additional feature of ADSD is the transmission of the Tested-Up array from the agent node to the manager node following the successful (fault free) test of the agent node. This provides for the continuous updating of information in the MIB of each node. Other embodiments of this feature include the agent node transmitting its MIB information to nodes other than the manager node, and multicasting the MIB information over the entire network.

The remaining two groups, the Config and the Address groups, are particular to the algorithm being mapped in the example, ADSD. The Config group provides access to the parameters that effect the algorithm's execution, such as timeout settings, along with useful information, such as the current version of ADSD executing on the machine. In ADSD, each node is assigned a unique node number to order the nodes, thereby creating the ring structure described earlier. The Address group provides a translation table between the nodes numbers used by ADSD, and the more common IP addresses used to name host machines.

B

Although the example above encapsulates ADSD into SNMP, it should be understood that the present invention also provides for the execution of servers. The implementation of a server follows the same two concepts as mentioned above. As a matter of semantics, however, it is customary to refer to the manager node as a client node and to the agent node as a server node. The main benefit of encapsulation services is that outside users need only support a single protocol, namely SNMPv1, to use a variety of services. Indeed, encapsulation provides a standardized way of invoking services and representing data using SNMPv1 MIBs and messages.

The concept of encapsulating or incorporating a distributed server in SNMPv1 can be extended to a number of server applications. For example, ADSD normally provides a "diagnosis" service to the nodes on which it operates and any outside agencies. The diagnosis of a system is determined by running a diagnosis procedure on a "tested-up array" stored in the MIB of a server node (depicted in FIG. 6). To invoke this service under SNMPv1, a client node simply issues a Get request for the "diagnosis" array of a server node, and the current diagnosis is returned. No additional interface (via a library call or proprietary message protocol) is required.

Other examples include a time server and a remote procedure call. In a time server, a client node issues a "Get" request to the SNMPv1 server node running on the time server to retrieve the current time. The current time is mapped into the server node's MIB location. In a remote procedure call, a client node issues a "set" command to a server node. The command contains the parameters of the call (mapped into appropriate placeholder locations in the MIB) and a GO bit (mapped into a command variable in the MIB). The server node responds with a GetResponse or a Trap command containing the result.

A news server or print server could also be used. As a news server, a user would read a news group by having a client node retrieve a table containing the current messages from the MIB of a server node via a trap command. As a print server, data to be printed is written into a string location in the MIB. Although these application may be less efficient than the NNTP protocol or print services currently used since SNMPv1 is not designed for bulk information, this situation may change with the advent of more efficient servers.

C

The present invention's innovations of peer management and encapsulation for algorithms and services can be implemented in a Local Access Network (LAN) system using a variety of physical linkages or layers such as T1, Ethernet, and Asynchronous Transfer Mode (ATM). Of these, the integration of ATM and SNMPv1 provides for an interesting embodiment of the present invention. Two schemes for integrating SNMP into an ATM LAN can be used.

Figure 7A:
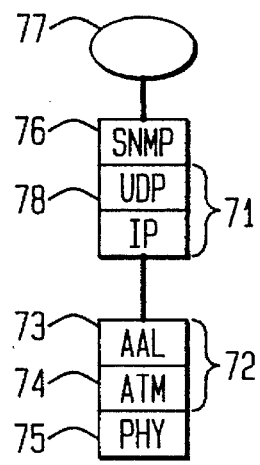
FIGS. 7(a) and 7(b) show two implementation schemes of SNMPv1 on an ATM LAN network.

Referring to FIG. 7(a), the first scheme is depicted in stack 77 which uses the combination of a TCP/IP protocol suite 71 and an ATM protocol suite 72. In this embodiment, TCP/IP protocol suite 71 uses a User Datagram Protocol (UDP) layer 78 instead of the traditional TCP layer. The ATM protocol suite 72 replaces the data link and some physical layers with an ATM Adaptable Layer (AAL) 73 and an ATM layer 74. The combination of the TCP/IP and ATM protocols suites couples a physical layer 75 with a SNMPv1 layer 76. While such a scheme is desirable for its compatibility with existing software, protocol stack 77 adds additional overhead to SNMPv1 processing.

Figure 7B:
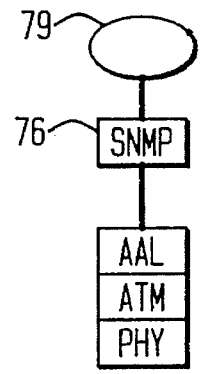

As depicted in FIG. 7(b), a better method of implementing an SNMPv1 based ATM LAN system is shown in stack 79. This embodiment utilizes the intelligence of the ATM protocol suite 72 which enables it to route and switch, and not merely to facilitate point to point communications. Consequently, the TCP/IP protocol suite 71 is eliminated and the ATM protocol suite 72 communicates directly with the SNMPv1 layer 76. This represents a "lite" protocol stack which reduces overhead at the nodes.

Obviously, numerous modifications and variations of the present invention are possible in light of the above teachings. It is therefore understood that within the scope of the appended claims, the invention may be practiced otherwise than as specifically described herein.

What is claimed is:

1. A method for executing a distributed algorithm in a Simple Network Management Protocol Version 1 (SNMPv1) based computer network, said SNMPv1 uses messages including Get, GetNext, Set, GetResponse and Trap messages, said algorithm has a proprietary protocol and variables, said variables include commands, placeholders and data, said network has nodes, each node having a managed information base (MIB), said method comprising the steps of:

a. configuring each of said nodes as a manager node at one interval and as an agent node at another interval in said network to function as peers,
   i. wherein when a first node acts as a manager node said first manager node sends a Get message to another node acting as art agent node to read said agent node's MIB and said manager node sends a Set message to said agent node to write to message to said agent node to said agent node's MIB; and
   ii. when said first node acts as an agent node said first agent node sends a GetResponse message to another manager node in response to a Get message received from said another manager node and said first agent node sends a Trap message to said another manager node in response to an event;
b. incorporating said algorithm within said SNMPv1 by:
   i. mapping said proprietary protocol to said SNMPv1 messages having equivalent functionality; and
   ii. mapping said variables to certain locations in said MIB; and
c. wherein said SNMPv1 computer network is an Asynchronons Transfer Mode (ATM) network having an ATM protocol suite; and wherein said method further comprises directly interfacing said SNMPv1 into said ATM protocol suite.

2. The method of claim 1, wherein step b.ii. comprises:
   (a) mapping algorithm command variables to a certain location in said MIB;
   (b) mapping algorithm placeholder variables to a certain location in said MIB; and
   (c) mapping algorithm data variables to a certain location in said MIB.

3. The method of claim 2 wherein step a. further comprises:
   iii. arranging said nodes in a logical ring forming a certain sequence of said nodes;
and wherein said method further comprises:
c. executing said algorithm to perform the steps of:
   i. sending a set command from an agent/manager node acting as a manager node to an agent/manager node acting as a agent node in said certain sequence until a certain agent node responds; and,
   ii. updating the data variables in the MIB of said manager node by having said certain agent node forward the data variables stored in its MIB to the MIB of said manager node via a trap command.

4. The method of claim 3, wherein said certain agent node of step c.ii. forwards the data variables in its MIB to nodes other than said manager node.

5. The method of claim 3, wherein said certain agent node of step c.ii. multicasts the data variables in its MIB to all other nodes in said network.

6. The method of claim 3 wherein said algorithm is selected from the group consisting of a distributed system diagnostics algorithm, a distributed load balancing algorithm, and a distributed user balancing algorithm.

7. The method of claim 3 wherein said algorithm is a diagnostic algorithm and said MIB contains a fault array; and wherein step c.i. further comprises:
   iii. diagnosing faulty nodes by evaluating said fault array, each node being able to make such a diagnosis.

8. The method of claim 7 further comprising:

e. modifying said computer network to compensate for faulty nodes.

9. The method of claim 3 wherein said algorithm is Adaptive Distributed System Diagnostics (ADSD).

10. The method of claim 9 wherein step b.ii. (a) comprises:
   (i) establishing a MIB control group by mapping said algorithm command variables to a certain location in said MIB;
and wherein step b.ii.(b) comprises:
   (i) establishing a MIB placeholder group by mapping said algorithm placeholder variables to a certain location in said MIB;
and wherein step b.ii.(c) comprises:
   (i) establishing a MIB data group by mapping said algorithm data to a certain location in said MIB;
and wherein step b.ii. further comprises:
   d) establishing a MIB address group by mapping a translation table of nodes numbers used by ADSD and IP addresses used by said computer network to a certain location in said MIB; and
   e) establishing a MIB configuration group by mapping parameters used by said ADSD to a certain location in said MIB.

11. A computer apparatus for executing a distributed algorithm in a Simple Network Management Protocol Version 1 (SNMPv1) based computer network, said SNMPv1 uses messages including Get, GetNext, Set, GetResponse and Trap messages, said algorithm has a proprietary protocol and variables, said variables include commands, placeholders and data, said network has nodes, each node having a managed information base (MIB), said apparatus comprises:

a. agent/manager node wherein:
   i. each agent/manager node acts as a manager node, said manager node sends a Get message to an agent node to read a certain location in an agent node's MIB and sends a Set message to an agent node to write to a certain location in an agent node's MIB; and
   ii. each agent/manager node acts as an agent node, said agent node sends a GetResponse message to a manager node in response to a Get message and sends a Trap message in response to an event; and
b. an encapsulation map for incorporating said algorithm within said SNMPv1 wherein:
   i. said encapsulation map contains a translation of said proprietary protocol to said SNMPv1 messages having equivalent functionality; and
   ii. said encapsulation map contains sufficient programmed instructions to assign said variable to certain locations in said MIB; and
c. wherein said computer network is an Asynchronons Transfer Mode (ATM) network having an ATM protocol suite; and wherein said apparatus further comprises a direct interface of said SNMPv1 into said ATM protocol suite.

12. The apparatus of claim 11, wherein said programmed instructions:
   a) assign algorithm command variables to a certain location in said MIB;
   b) assign algorithm placeholder variables to a certain location in said MIB; and
   c) assign algorithm data variables to a certain location in said MIB.

13. The apparatus of claim 11 wherein said algorithm is Adaptive Distributed System Diagnostics.

14. The apparatus of claim 12 wherein said agent/manager nodes form a logical ring having a certain sequence of said agent/manager nodes; and wherein said apparatus further comprises:

c. an algorithm to perform the steps of:
  i. sending a set command from an agent/manager node acting as a manager node to an agent/manager node acting as a agent node in said certain sequence until a certain agent node responds; and,
  ii. updating the data variables in the MIB of said manager node by having said certain agent node forward the data variables in its MIB to the MIB of said manager node via a trap command.

15. The apparatus of claim 14, wherein said certain agent node of step c.ii. forwards the data variables in its MIB to nodes other than said manager node.

* * * * *